United States Patent
Su et al.

(10) Patent No.: US 9,876,660 B2
(45) Date of Patent: Jan. 23, 2018

(54) APPARATUS AND METHOD FOR ESTIMATING CARRIER FREQUENCY OFFSET

(71) Applicant: MStar Semiconductor, Inc., Hsinchu Hsien (TW)

(72) Inventors: Yu-Che Su, Hsinchu Hsien (TW); Tai-Lai Tung, Hsinchu Hsien (TW)

(73) Assignee: MStar Semiconductor, Inc., Hsinchu Hsien (TW)

(*) Notice: Subject to any disclaimer, the term of this patent is extended or adjusted under 35 U.S.C. 154(b) by 0 days.

(21) Appl. No.: 15/401,306

(22) Filed: Jan. 9, 2017

(65) Prior Publication Data

US 2017/0201404 A1  Jul. 13, 2017

(30) Foreign Application Priority Data

Jan. 12, 2016 (TW) .............................. 105100814 A

(51) Int. Cl.
*H04L 27/22* (2006.01)
*H04L 27/227* (2006.01)
*H04L 27/26* (2006.01)

(52) U.S. Cl.
CPC ...... *H04L 27/2273* (2013.01); *H04L 27/2614* (2013.01)

(58) Field of Classification Search
CPC .................. H04L 2027/003; H04L 2027/0051
See application file for complete search history.

(56) References Cited

U.S. PATENT DOCUMENTS 8,064,553 B2 * 11/2011 Gu ...................... H04L 27/2659
                                                      375/260
8,149,962 B2 * 4/2012 Jo ....................... H04L 27/2659
                                                      370/203

(Continued)

FOREIGN PATENT DOCUMENTS

WO  WO 2010099808 A1 * 9/2010 ......... H04L 27/2659

*Primary Examiner* — Chieh M Fan
*Assistant Examiner* — Berhanu Tadese
(74) *Attorney, Agent, or Firm* — Edell, Shapiro & Finnan, LLC

(57) ABSTRACT

An apparatus for estimating carrier frequency offset includes an $M^{th}$ power circuit, a spectrum generating circuit, a peak frequency determining circuit and a frequency offset determining circuit. The $M^{th}$ power circuit performs an $M^{th}$ power calculation on an input signal to generate an $M^{th}$ power calculation result. The spectrum generating circuit generates an $M^{th}$ power spectrum according to the $M^{th}$ power calculation result. The peak frequency determining circuit determines a peak frequency corresponding to an amplitude peak from the $M^{th}$ power spectrum. The frequency offset determining circuit determines an estimated carrier frequency offset according to the peak frequency.

14 Claims, 4 Drawing Sheets

(56) References Cited

U.S. PATENT DOCUMENTS

| | | | | |
|---|---|---|---|---|
| 8,611,472 B2* | 12/2013 | Mishra | ............... | H04L 27/0014 375/260 |
| 2002/0065047 A1* | 5/2002 | Moose | ................. | H04L 5/0048 455/67.11 |
| 2005/0025264 A1* | 2/2005 | Chen | ................... | H04L 27/2659 375/346 |
| 2005/0094739 A1* | 5/2005 | Takesue | ............. | H04L 27/2657 375/260 |
| 2008/0212717 A1* | 9/2008 | Wiss | .................. | H04L 27/3818 375/326 |
| 2010/0216459 A1* | 8/2010 | Yu | ....................... | H04J 11/0069 455/434 |
| 2013/0114238 A1* | 5/2013 | Cho | ..................... | H01L 51/504 362/1 |
| 2013/0114453 A1* | 5/2013 | Hung | .................. | H04L 27/261 370/252 |
| 2014/0093018 A1* | 4/2014 | Wei | ........................ | H04L 7/042 375/343 |

* cited by examiner

APPARATUS AND METHOD FOR ESTIMATING CARRIER FREQUENCY OFFSET

This application claims the benefit of Taiwan application Serial No. 105100814, filed Jan. 12, 2016, the subject matter of which is incorporated herein by reference.

BACKGROUND OF THE INVENTION

Field of the Invention

The invention relates in general to an electronic signal receiving apparatus, and more particularly, to a technology for estimating carrier frequency offset in an electronic signal receiving apparatus.

Description of the Related Art

Various types of communication systems get more and more popular as related technologies in the electronics field continue to advance. Each of a transmitter and a receiver of a communication system is provided with at least one oscillation signal source (e.g., a quartz oscillator) that provides a clock signal as a basis for circuit operations. During an operation process, clock frequencies of the transmitter and the receiver need to achieve certain consistency in order to have the receiver correctly parse signals sent from the transmitter. If the frequency of a clock signal that the receiver adopts for down-converting an input signal differs from the frequency of a clock signal that the transmitter adopts for up-converting a baseband signal, such issue is commonly referred to as carrier frequency offset at the receiver. The carrier frequency offset may lead to inter-carrier interference, causing negative effects such as degraded system performance of the receiver, and the receiver may even become incapable of parsing its input signal in some severe cases.

One factor causing the carrier frequency offset is usually mismatch between respective oscillators at a transmitter and a receiver. In practice, the transmitter and receiver may be fabricated by different manufactures based on different hardware of different specifications. Thus, exact matching between the oscillators at these two ends is extremely difficult, and so the receiver is usually designed with a mechanism for compensating carrier frequency offset. In general, a receiver needs to first correctly estimate the value of the carrier frequency offset before frequency offset compensation can be effectively conducted.

SUMMARY OF THE INVENTION

The invention is directed to an apparatus and method for estimating carrier frequency offset.

According to an embodiment of the present invention, an apparatus for estimating carrier frequency offset is provided. The apparatus includes an $M^{th}$ power circuit, a spectrum generating circuit, a peak frequency determining circuit and a frequency offset determining circuit. The $M^{th}$ power circuit performs an $M^{th}$ power calculation on an input signal to generate an $M^{th}$ power calculation result, wherein M is an integer greater than 1 and is associated with a modulation scheme applied to the input signal. The spectrum generating circuit generates an $M^{th}$ power spectrum according to the $M^{th}$ power calculation result. The peak frequency determining circuit determines a peak frequency corresponding to an amplitude peak from the $M^{th}$ power spectrum. The frequency offset determining circuit determines an estimated carrier frequency offset according to the peak frequency.

According to an embodiment of the present invention, a method for estimating carrier frequency offset is provided. An $M^{th}$ power calculation is performed on an input signal to generate an $M^{th}$ power calculation result, wherein M is an integer greater than 1 and is associated with a modulation scheme applied to the input signal. An $M^{th}$ power spectrum is generated according to the $M^{th}$ power calculation result. A peak frequency corresponding to an amplitude peak is determined from the $M^{th}$ power spectrum. An estimated carrier frequency offset is determined according to the peak frequency.

The above and other aspects of the invention will become better understood with regard to the following detailed description of the preferred but non-limiting embodiments. The following description is made with reference to the accompanying drawings.

Figure 1:
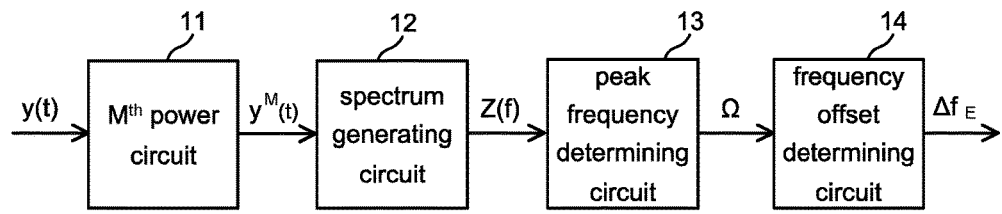
FIG. 1 is a function block diagram of a carrier frequency offset estimating apparatus according to an embodiment of the present invention.
Figure 2:
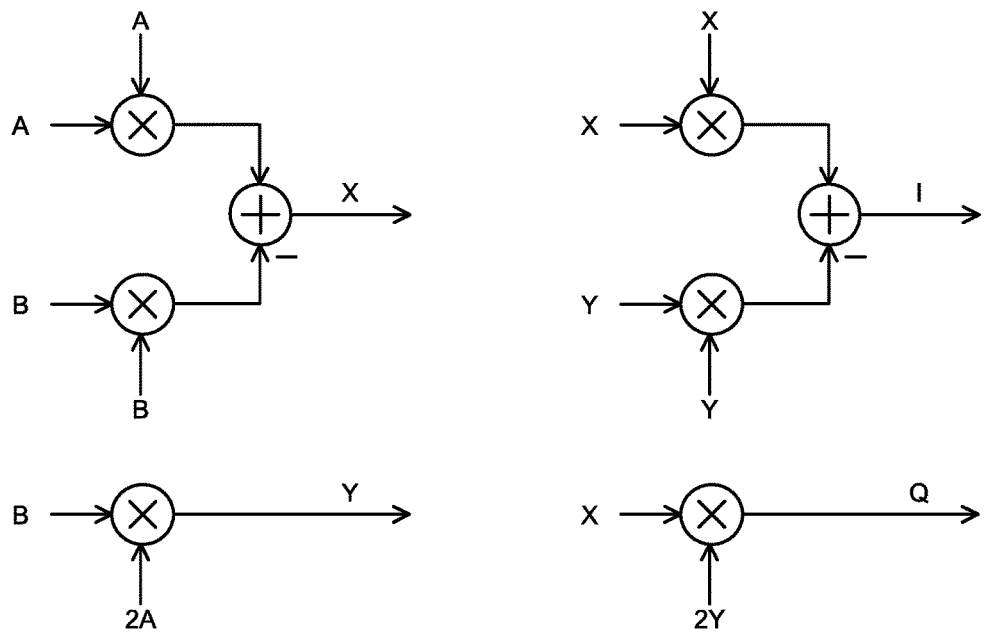
FIG. 2 is an example of a $4^{th}$ order spectrum of an input signal.

It should be noted that, the drawings of the present invention include functional block diagrams of multiple functional modules related to one another. These drawings are not detailed circuit diagrams, and connection lines therein are for indicating signal flows only. The interactions between the functional elements/or processes are not necessarily achieved through direct electrical connections. Further, functions of the individual elements are not necessarily distributed as depicted in the drawings, and separate blocks are not necessarily implemented by separate electronic elements.

DETAILED DESCRIPTION OF THE INVENTION

The apparatus and method for estimating carrier frequency offset of the present invention may be applied to a receiver of various communication systems, for example but not limited to, a Digital Video Broadcasting-Satellite (DVB-S) receiver and a Digital Video Broadcasting-Cable (DVB-C) receiver. FIG. 1 shows a functional block diagram of a frequency carrier offset estimating apparatus according to an embodiment of the present invention. The frequency carrier offset estimating apparatus 100 includes an $M^{th}$ power circuit 11, a spectrum generating circuit 12, a peak frequency determining circuit 13 and a frequency offset determining circuit 14. Functions of these circuits are given below.

An input signal y(t) provided to the $M^{th}$ power circuit 11 is a baseband signal. In practice, the baseband may be, for example but not limited to, a baseband signal correspondingly generated after a radio-frequency (RF) signal enters a receiver coordinating with the carrier frequency offset estimating apparatus 100 and passes circuits such a low-noise amplifying circuit, a down-converting circuit, an analog-to-digital converter (ADC) and a low-pass filter (LPF). The $M^{th}$ power circuit 11 performs an $M^{th}$ power calculation on the input signal y(t) to generate an $M^{th}$ power calculation result $y^M(t)$, where M is a positive integer greater than 1 and is associated with a modulation scheme applied to the input signal y(t). For example, when the modulation scheme of the input signal y(t) is quadrature phase-shift keying (QPSK), the integer M may be equal to an integral multiple of 4; when the modulation scheme of the input signal y(t) is 8 phase-shift keying (8PSK), the integer M may be an integral multiple of 8. By expressing the input signal y(t) as a complex signal A+Bj, a $4^{th}$ calculation result may be expanded as:

$$(A+Bj)^4-(A^2-B^2+2ABj)^2-(X+Yj)^2=X^2-Y^2+2XXj \quad (1)$$

In equation (1), the signal $X=A^2-B^2$, and the signal $V=2AB$. FIG. shows an implementation example of a $4^{th}$ power calculation circuit based on equation (1). A signal I and a signal Q outputted at the end respectively represent a real part and an imaginary part of the $4^{th}$ power calculation result. Various types of $M^{th}$ power calculation circuits may be realized through the similar expansion concept.

The spectrum generating circuit 12 generates a spectrum, which is to be referred to as an $M^{th}$ power spectrum Z(f), according to the $M^{th}$ power calculation result $y^M(t)$ that the $M^{th}$ power circuit 11 outputs. In practice, for example but not limited to, the spectrum generating circuit 12 may generate the spectrum using fast Fourier transform (FFT). It should be noted that, details for generating a spectrum are generally known to one person skilled in the art, and shall be omitted herein.

The function of the $M^{th}$ power spectrum Z(f) are illustrated with the input signal y(t) being a QPSK signal and the multiple M equal to 4. Assuming that an RF signal transmitted from a transmitter corresponds to a baseband signal x(t):

$$x(t)=\Sigma_k a_k g(t-kT) \quad (2)$$

In equation (2), g(t) represents a pulse shaping mechanism adopted by the transmitter, $a_k$ represents a constellation point in the QPSK cluster, and T represents a symbol duration of the signal.

Correspondingly, the input signal y(t) provided to the $M^{th}$ power circuit 11 may be represented as:

$$y(t)=e^{j2\pi\Delta ft}\Sigma_{k=-\infty}^{\infty} a_k g(t-kT)+n(t) \quad (3)$$

In equation (3), $\Delta f$ represents the carrier frequency offset, and n(t) represents a noise signal.

According to equation (3), an expected value of the input signal y(t) raised to the power of 4 may be represented as:

$$E\{y^4(t)\} = E\left\{\left[e^{j2\pi\Delta ft}\sum_{k=-\infty}^{\infty} a_k g(t-kT)+n(t)\right]^4\right\} \quad (4)$$

$$= E\left\{e^{j2\pi 4\Delta ft}\sum_{m=-\infty}^{\infty}\sum_{n=-\infty}^{\infty}\sum_{k=-\infty}^{\infty}\sum_{l=-\infty}^{\infty} a_m a_n a_k a_l g(t-mT)g(t-nT)\right.$$

$$\left. g(t-kT)g(t-lT)+n^4(t)\right\}$$

$$= e^{j2\pi 4\Delta ft}\sum_{m=-\infty}^{\infty}\sum_{n=-\infty}^{\infty}\sum_{k=-\infty}^{\infty}\sum_{l=-\infty}^{\infty} E[a_m a_n a_k a_l]g(t-mT)g(t-nT)$$

$$g(t-kT)g(t-lT)+E\{n^4(t)\}$$

$$= e^{j2\pi 4\Delta ft}\sum_{m=-\infty}^{\infty} C_4 g^4(t-mT)+E\{n^4(t)\}$$

For the constellation point $a_k$ in the QSK cluster, the expected value $E[a_k]=E[a_k^2]=E[a_k^3]=0$, and the expected value $E[a_k^4]$ is equal to the parameter $C_4$ and is not equal to 0. Further, the signal $\Sigma_{m=-\infty}^{\infty} g^4(t-mT)$ in equation (4) is a periodic signal having a period T, and can be represented in form of a Fourier series as:

$$u(t) = \sum_{m=-\infty}^{\infty} g^4(t-mT) = \sum_{k=-\infty}^{\infty} c_k e^{j2\pi\frac{k}{T}t} \quad (5)$$

In equation (5), $c_k$ is:

$$c_k = \frac{1}{T}\int_g^T u(t)e^{-j2\pi\frac{k}{T}t}dt \quad (6)$$

By substituting the equation $u(t)=\Sigma_{m=-\infty}^{\infty} g^4(t-mT)$, equation (6) may be expanded as:

$$c_k = \frac{1}{T}\int_g^T u(t)e^{-j2\pi\frac{k}{T}t}dt = \frac{1}{T}\int_0^T \sum_{m=-\infty}^{\infty} g^4(t-mT)e^{-j2\pi\frac{k}{T}t}dt \quad (7)$$

$$= \frac{1}{T}\int_0^T \sum_{m=-\infty}^{\infty} g^4(t-mT)e^{-j2\pi\frac{k}{T}t}dt$$

$$= \frac{1}{T}\sum_{m=-\infty}^{\infty}\int_{-mT}^{mT+T} g^4(\tau)e^{-j2\pi\frac{k}{T}(\tau+mT)}d\tau$$

$$= \frac{1}{T}\sum_{m=-\infty}^{\infty}\int_{-mT}^{mT+T} g^4(\tau)e^{-j2\pi\frac{k}{T}\tau}d\tau = \frac{1}{T}\int_{-\infty}^{\infty} g^4(\tau)e^{-j2\pi\frac{k}{T}\tau}d\tau$$

The last algorithm of equation (7) may be regarded as a FFT result of (1/T) multiplied by the frequency (k/T) for $g^4(t)$. That is to say, the parameter $c_k$ is an FFT result of (1/T) multiplied by the frequency (k/T) for $g^4(t)$.

By representing the FFT result of g(t) by G(f) the FFT result of $g^4(t)$ is equal to $G(f)*G(f)*G(f)*G(f)$. Theoretically, the energy distribution range of G(f) is between frequencies (−1/T) and (1/T). Correspondingly, the energy distribution of $G(f)*G(f)*G(f)*G(f)$ is between frequencies (−4/T) and (4/T). It is deduced that, in all parameters $c_k$ in equation (5), only the parameters $c_k$ having corresponding frequencies within the frequency range (−4/T) and (4/T) are not equal to 0. In other words, among all the parameters $c_k$ in equation (5), only 7 parameters, $c_{-3}, c_{-2}, c_{-1}, c_0, c_1, c_2$ and $c_3$, are not equal to 0. Thus, equation (5) can be rewritten as:

$$u(t) = \sum_{m=-\infty}^{\infty} g^4(t-mT) = \sum_{k=-3}^{3} c_k e^{j2\pi\frac{k}{T}t} \quad (8)$$

And equation (4) is rewritten as:

$$E\{y^4(t)\} = e^{j2\pi\Delta_f t} \cdot C_4 \cdot \sum_{k=-3}^{3} c_k e^{j2\pi\frac{k}{T}t} + E(n^4(t))] \quad (9)$$

According to equation (9), without considering the noise n(t), the $4^{th}$ power calculation result $y^4(t)$ mainly corresponds to signal components of frequencies $(-3/T+4\Delta f)$, $(-2/T+4\Delta f)$, $(-1/T+4\Delta f)$, $4\Delta f$, $(1/T+4\Delta f)$, $(2/T+4\Delta f)$ and $(3/T+4\Delta f)$. Further, the frequencies corresponding to the signal components mainly included in the $4^{th}$ power calculation result $y^4(t)$ may be concluded to a form of $(n/T+4\Delta f)$, where n is an integral index value.

The peak frequency determining circuit 13 identifies a peak value with a maximum amplitude from the $4^{th}$ power spectrum Z(f) generated by the spectrum generating circuit 12, and determines a frequency (to be referred to as a peak frequency Ω) corresponding to the peak value. According to the previously deduced result, the frequencies corresponding to the signal components mainly included in the $4^{th}$ power calculation result $y^4(t)$ may be concluded to a form of $(n/T+4\Delta f)$, where n is an integral index value. Thus, the peak frequency Ω determined by the peak frequency determining circuit 13 may be equal to or close to the frequency $(n/T+4\Delta f)$ corresponding to one certain index value n. It should be noted that, one spirit of the present invention is that, performing a $4^{th}$ power calculation or a calculation of raising to a power of a multiple of 4 effectively eliminates the randomness of the input signal y(t). It is known based on the foregoing deduction that, regardless of the message carried in the input signal y(t), for any constellation point $\alpha_k$ in the QPSK cluster, the $4^{th}$ power calculation result $y^4(t)$ may be concluded to a form of $(n/T+4\Delta f)$. Accordingly, for any input signal y(t), the peak frequency Q determined by the peak frequency determining circuit 13 is equal to or close to the frequency $(n/T+4\Delta f)$ corresponding to one certain index value n. This characteristic is applicable to a situation where an input signal y(t), e.g., has an 8PSK modulation scheme, and the integer M is equal to 8 or a multiple of 8.

Figure 3:
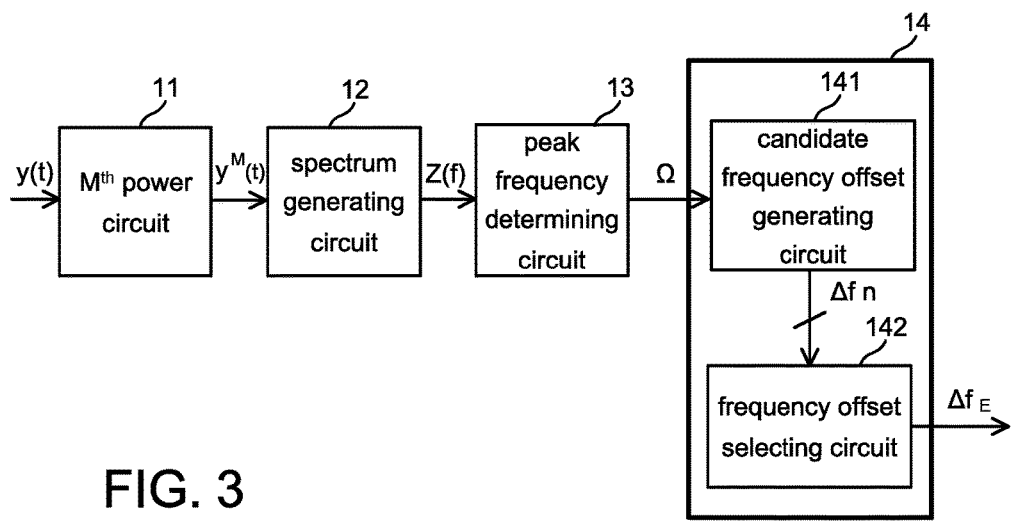
FIG. 3 is a detailed implementation example of a frequency offset determining circuit according to an embodiment of the present invention.

The frequency offset determining circuit 14 determines an estimated carrier frequency offset $\Delta f_E$ according to the peak frequency Ω determined by the peak frequency determining circuit 13. As shown in FIG. 3, in one detailed embodiment, the frequency offset determining circuit 14 includes a candidate frequency offset generating circuit 141 and a frequency offset selecting circuit 142. The candidate frequency offset generating circuit 141 generates a plurality of candidate frequency offsets according to the peak frequency Ω. The frequency offset selecting circuit 142 selects one estimated carrier frequency offset $\Delta f_E$ from the plurality of candidate frequency offsets, as an output signal of the carrier frequency offset estimating apparatus 100.

Based on the foregoing deduction of $\Omega \cong n/T+4\Delta f_n$, the candidate frequency offset generating circuit 141 may identify multiple candidate frequency offsets $\Delta f_n$ corresponding to different index values n as the candidate frequency offsets. For example, corresponding to an index value n=-3, the candidate frequency offset generating circuit 141 obtains one candidate frequency offset $\Delta f_{-3}=(\Omega+3/T)/4$, corresponding to an index value n=-2, the candidate frequency offset generating circuit 141 obtains one candidate frequency offset $\Delta f_{-2}=(\Omega+2/T)/4$; corresponding to an index value n=-1, the candidate frequency offset generating circuit 141 obtains one candidate frequency offset $\Delta f_{-1}=(\Omega+1/T)/4$; and so forth.

It should be noted that, the above concept may be extended to other integers M (i.e., other situations where M is not equal to 4). More specifically, the candidate frequency offset generating circuit 141 may generate a plurality candidate frequency offsets $\Delta f_n$:

$$\Omega \cong \frac{n}{T} + M\Delta f_n \quad (10)$$

In practice, the range of the index value n that the candidate frequency offset generating circuit 141 uses to generate the candidate frequency offsets is not limited to specific values. For example, the candidate frequency offset generating circuit 141 may generate 201 candidate frequency offsets for 201 possibilities for index values n=-100 to 100 for the frequency offset selecting circuit 142. In one embodiment, the candidate frequency offset generating circuit 141 is designed to select a candidate frequency offset in a predetermined frequency range, which is associated with a sampling frequency $f_s$ previously applied on the input signal y(t). For example, the sampling frequency $f_s$ may be a sampling frequency performed in an analog-to-digital converter (ADC) in the receiver coordinating with the carrier frequency offset estimating apparatus 100 before the input signal y(t) enters the $M^{th}$ power circuit 11. Generally known to one person skilled in the art, the range of the sampling frequency $f_s$ limits the signal range perceptible to the carrier frequency offset estimating apparatus 100. More specifically, the carrier frequency offset estimating apparatus 100 is able to perceive only signals between the frequency range $(-f_s/2)$ and $(f_s/2)$. Thus, the candidate frequency offset generating circuit 141 may select the candidate frequency offsets $\Delta f_n$ corresponding to which indices n according to the value of the sampling frequency $\Delta f_n$, e.g, selecting candidate frequency offsets $\Delta f_n$ with absolute values smaller than the frequency $(f_s/2)$. Assume that the peak frequency Ω that the peak frequency determining circuit 13 determines from the $4^{th}$ power is -12 MHz, and the reciprocal (1/T) of the symbol duration T is 20 MHz. According to the equation $\Delta f_n=(\Omega-n/T)$, it may be calculated that $\Delta f_{-9}$, is 42 MHz, $\Delta f_{-8}$ is 37 MHz, $\Delta f_{-7}$ is 32 MHz, ..., $\Delta f_7$ is -38 MHz, and $\Delta f_8$ is -43 MHz. If the sampling frequency $f_s$ is 80 MHz, the candidate frequency offset generating circuit 141 may only select the candidate frequency offset $\Delta f_n$ having absolute values smaller than 40 MHz, i.e., only selecting 16 candidate frequency offsets, including $\Delta f_{-8}$, $\Delta f_{-7}$, ... and $\Delta f_7$, and provide them the frequency offset selecting circuit 142.

Several methods that the frequency offset selecting circuit 142 may use to select the estimated carrier frequency offset $\Delta f_E$ are described below.

Figure 4A:
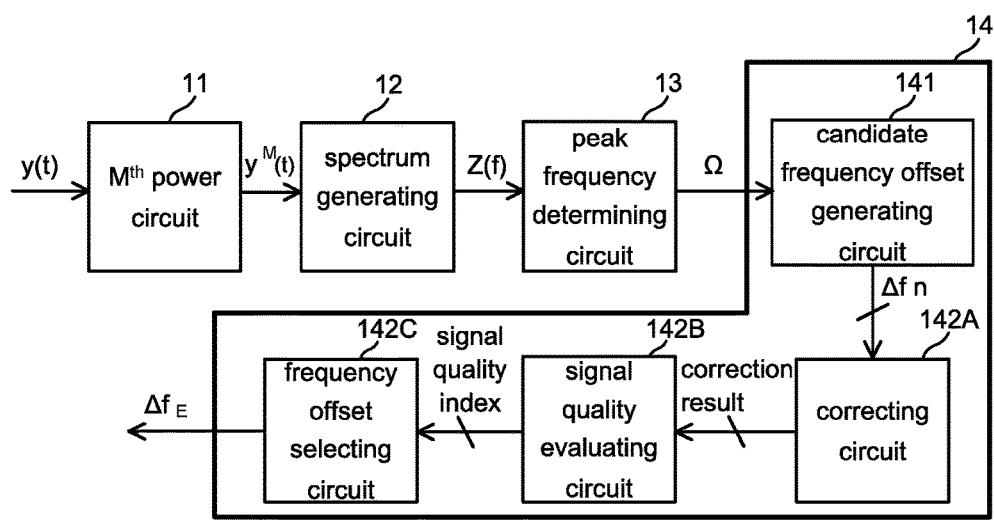
FIG. 4(A) and FIG. 4(B) are two detailed implementation examples of a frequency offset selecting circuit according to an embodiment of the present invention.

FIG. 4(A) shows a detailed embodiment of the frequency offset selecting circuit 142. In this embodiment, the frequency offset selecting circuit 142 includes a correcting circuit 142A, a signal quality evaluating circuit 142B and a frequency offset selecting circuit 142C. The correcting circuit 142A corrects the input signal y(t) according to the plurality of candidate frequency offsets $\Delta f_n$ to generate a plurality of corresponding correction results. The signal quality evaluating circuit 142 generates a signal quality index for each of the plurality of correction results. For example, the correcting circuit 142A may be a mixer, and the signal quality evaluating circuit 142B may be a decoder, but the present invention is not limited herein. The mixer mixes the input signal y(t) with a clock signal having a frequency equal to a candidate frequency offset $\Delta f_n$ to generate a mixed result as the correction result. The decoder decodes the correction results to determine the accuracy of the decoded results. For example, the signal quality index may be a bit error rate or a packet error rate, but the present invention is not limited herein. From the plurality of candidate frequency offsets $\Delta f_n$, the frequency offset selecting circuit 142C selects a candidate frequency offset corresponding to an optimum signal quality index (e.g., a candidate frequency offset with the lowest packet error rate) as the estimated carrier frequency offset $\Delta f_E$.

Figure 4B:
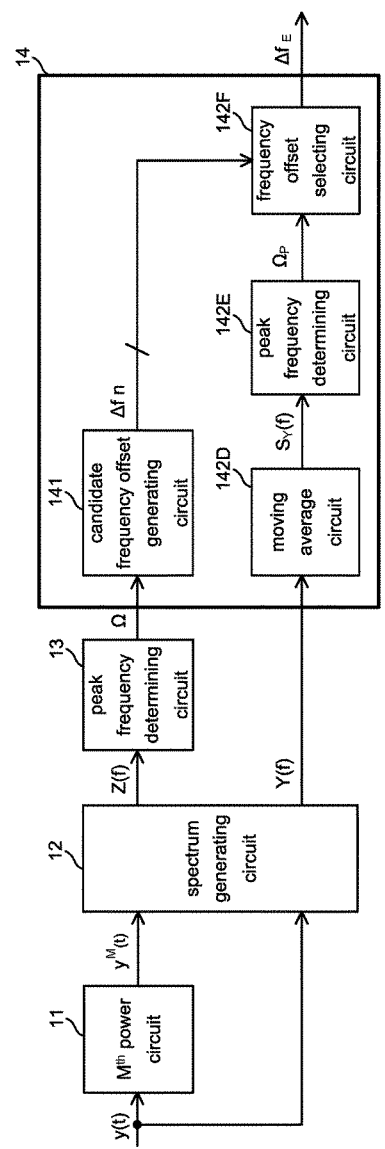

FIG. 4(B) shows another detailed embodiment of the frequency offset selecting circuit 142. The frequency offset selecting circuit 142 includes a moving averaging circuit 142D, a peak frequency determining circuit 142E and a frequency offset selecting circuit 142F. As shown in FIG. 4(B), the spectrum generating circuit 12 in this embodiment is further used to generate an input signal spectrum Y(f) for the input signal y(t). The moving averaging circuit 142D performs a moving average calculation on the input signal spectrum Y(f) to generate a moving average result $S_Y(f)$. In practice, the moving averaging circuit 142D, for example but not limited to, generates the moving average result $S_Y(f)$ by a simple moving average calculation. In other words, the moving averaging circuit 142D may generate the $S_Y(f)$ according to an equation:

$$S_y(f) = \int_{-\frac{1}{D}}^{\frac{1}{D}} |Y(f + \alpha)| d\alpha \quad (11)$$

In equation (11), D represents an average range parameter, and dα represents an integration variance. It should be noted that, details of the moving average calculation are generally known to one person skilled in the art, and shall be omitted herein.

The function of the moving average calculation is to eliminate minute disturbances caused by surges in the input signal spectrum Y(f). The peak frequency determining circuit 142E determines a frequency (to be referred to as a power peak frequency $\Omega_P$) corresponding to a power peak from the moving average result $S_Y(f)$. Next, from the plurality of candidate frequency offsets $\Delta f_n$ provided by the candidate frequency generating circuit 141, the frequency offset selecting circuit 142F selects a candidate frequency offset closest to the power peak frequency $\Omega_P$ as the estimated carrier frequency offset $\Delta f_E$. For example, assume that the peak frequency determining circuit 142E determines the power peak frequency $\Omega_P$ as 12 MHz, and the candidate frequency offset generating circuit 141 provides 8 candidate frequency offsets, including −17 MHz, −12 MHz, −7 MHz, −2 MHz, 3 MHz, 8 MHz, 13 MHz and 18 MHz. Because 13 MHz among the candidate frequency offsets is closest to the power peak frequency $\Omega_P$, the frequency offset selecting circuit 14F may select 13 MHz as the estimated carrier frequency offset $\Delta f_E$.

In practice, the peak frequency determining circuit 13 and the frequency offset determining circuit 14 may be realized by various kinds of control and processing platforms, including fixed and programmable logic circuits, e.g., programmable logic gate arrays, application-specific integrated circuits (ASIC), microcontrollers, microprocessors, and digital signal processors (DSP). Further, the peak frequency determining circuit 13 and the frequency offset determining circuit 14 may also be designed as a processor instruction stored in a memory (not shown), and the processor instruction may be executed to perform various tasks. One person skilled in the art can understand that, there are many other circuit configurations and elements capable of realizing the concept of the present invention without departing from the spirit of the present invention.

Figure 5:
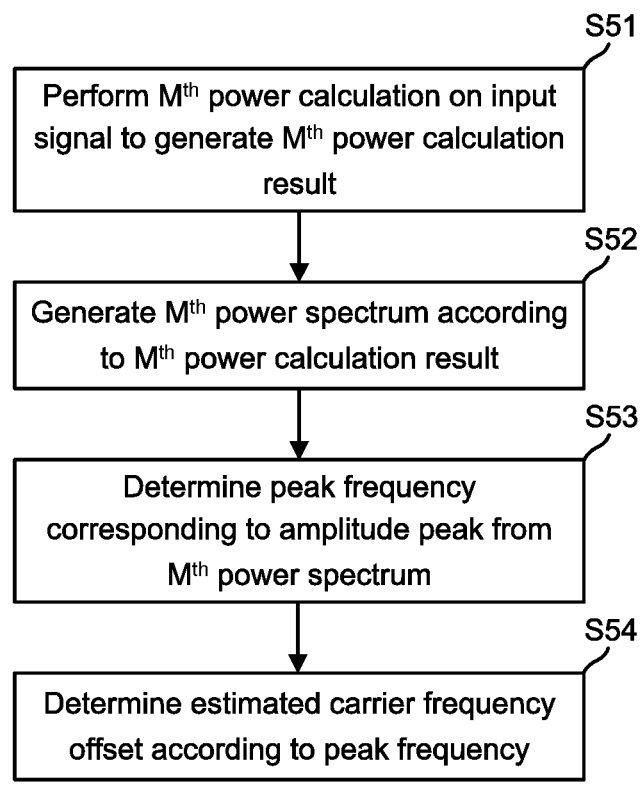
FIG. 5 is a flowchart of a carrier frequency offset estimating method according to an embodiment of the present invention.

FIG. 5 shows a flowchart of a carrier frequency offset estimating method according to another embodiment of the present invention. In step S51, an $M^{th}$ power calculation is performed on an input signal to generate an $M^{th}$ power calculation result, where M is an integer greater than 1 and is associated with a modulation scheme of the input signal. In step S52, an $M^{th}$ power spectrum is generated according to the $M^{th}$ power calculation result. In step S53, a peak frequency corresponding to an amplitude peak is determined from the $M^{th}$ power spectrum. In step S54, an estimated carrier frequency offset is determined according to the peak frequency.

One person skilled in the art can understand that, operation variations (e.g., methods for generating a plurality of candidate frequency offsets and selecting an estimated carrier frequency offset from a plurality of candidate frequency offsets) in the description associated with the carrier frequency offset estimating apparatus 100 are applicable to the carrier frequency offset estimating method in FIG. 5, and shall be omitted herein.

It should be noted that, the mathematical expressions in the disclosure are for illustrating principles and logics associated with the embodiments of the present invention. Unless otherwise specified, these mathematical expressions do not levy limitations to the present invention. One person skilled in the art can understand that, there are various other technologies capable of realizing the physical forms corresponding to these mathematical expressions.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An apparatus for estimating carrier frequency offset, comprising:

an $M^{th}$ power circuit, performing an $M^{th}$ power calculation on an input signal to generate an $M^{th}$ power calculation result, where M is an integer greater than 1 and is associated with a modulation scheme applied to the input signal;

a spectrum generating circuit, generating an $M^{th}$ power spectrum according to the $M^{th}$ power calculation result;

a peak frequency determining circuit, determining a peak frequency corresponding to an amplitude peak from the $M^{th}$ power spectrum; and a frequency offset determining circuit, determining an estimated carrier frequency offset according to the peak frequency, wherein the offset frequency determining circuit comprises:

a candidate frequency offset generating circuit, generating a plurality of candidate frequency offsets according to the peak frequency; and a frequency offset selecting circuit, selecting the estimated carrier frequency offset from the plurality of candidate frequency offsets, and wherein the spectrum generating circuit further generates an input signal spectrum according to the input signal, and the frequency offset selecting circuit comprises:
- a moving averaging circuit, performing a moving average calculation on the input signal spectrum to generate a moving average result;
- a peak frequency determining circuit, determining a power peak frequency corresponding to a power peak from the moving average result; and
- a frequency offset selecting circuit, selecting a candidate frequency offset closest to the power peak frequency from the plurality of candidate frequency offsets as the estimated carrier frequency offset.

2. The apparatus according to claim 1, wherein the candidate frequency offset generating circuit generates the plurality of candidate frequency offsets according to an equation:

$$\Omega \cong M\Delta f_n + \frac{n}{T};$$

wherein, $\Omega$ represents the peak frequency, T represents a symbol duration of the input signal, n represents an index value, $\Delta f_n$ represents a candidate frequency offset corresponding to the index value n, and respective index values of the candidate frequency offsets are different.

3. The apparatus according to claim 1, wherein the candidate frequency offset generating circuit selects the plurality of candidate frequency offsets in a predetermined frequency range, which is associated with a sampling frequency previously applied to the input signal.

4. The apparatus according to claim 1, wherein the frequency offset selecting circuit comprises:
- a correcting circuit, correcting the input signal to generate a plurality of corresponding correction results according to the plurality of candidate frequency offsets, respectively;
- a signal quality evaluating circuit, generating a signal quality index according to each of the plurality of correction results; and
- a frequency offset selecting circuit, selecting a candidate frequency offset corresponding to an optimum signal quality index from the plurality of candidate frequency offsets as the estimated carrier frequency offset.

5. The apparatus according to claim 4, wherein the signal quality index is a bit error rate or a packet error rate.

6. The apparatus according to claim 1, wherein the modulation scheme applied to the input signal is quadrature phase-shift keying (QPSK), and the integer M is equal to an integral multiple of 4.

7. A method for estimating carrier frequency offset, comprising:
a) performing an $M^{th}$ power calculation on an input signal to generate an $M^{th}$ power calculation result, where M is an integer greater than 1 and is associated with a modulation scheme applied to the input signal;
b) generating an $M^{th}$ power spectrum according to the $M^{th}$ power calculation result;
c) determining a peak frequency corresponding to an amplitude peak from the $M^{th}$ power spectrum; and
d) determining an estimated carrier frequency offset according to the peak frequency, wherein step (d) comprises:
d1) generating a plurality of candidate frequency offsets according to the peak frequency; and
d2) selecting the estimated carrier frequency offset from the plurality of candidate frequency offsets, and
wherein step (d2) comprises:
generating an input signal spectrum according to the input signal;
performing a moving average calculation on the input signal spectrum to generate a moving average result;
determining a power peak frequency corresponding to a power peak from the moving average result; and
selecting a candidate frequency offset closest to the power peak frequency from the plurality of candidate frequency offsets as the estimated carrier frequency offset.

8. The method according to claim 7, wherein step (d1) comprises generating the plurality of candidate frequency offsets according to an equation:

$$\Omega \cong M\Delta f_n + \frac{n}{T};$$

wherein, $\Omega$ represents the peak frequency, T represents a symbol duration of the input signal, n represents an index value, $\Delta f_n$ represents a candidate frequency offset corresponding to the index value n, and respective index values of the candidate frequency offsets are different.

9. The method according to claim 7, wherein step (d1) comprises selecting the plurality of candidate frequency offsets in a predetermined frequency range, which is associated with a sampling frequency previously applied to the input signal.

10. The method according to claim 7, wherein step (d2) comprises:
- correcting the input signal to generate a plurality of corresponding correction results according to the plurality of candidate frequency offsets, respectively;
- generating a signal quality index according to each of the plurality of correction results; and
- selecting a candidate frequency offset corresponding to an optimum signal quality index from the plurality of candidate frequency offsets as the estimated carrier frequency offset.

11. The method according to claim 10, wherein the signal quality index is a bit error rate or a packet error rate.

12. The method according to claim 7, wherein the modulation scheme applied to the input signal is quadrature phase-shift keying (QPSK), and the integer M is equal to an integral multiple of 4.

13. An apparatus for estimating carrier frequency offset, comprising:
- an $M^{th}$ power circuit, performing an $M^{th}$ power calculation on an input signal to generate an $M^{th}$ power calculation result, where M is an integer greater than 1 and is associated with a modulation scheme applied to the input signal;
- a spectrum generating circuit, generating an $M^{th}$ power spectrum according to the $M^{th}$ power calculation result;
- a peak frequency determining circuit, determining a peak frequency corresponding to an amplitude peak from the $M^{th}$ power spectrum; and
- a frequency offset determining circuit, determining an estimated carrier frequency offset according to the peak frequency, wherein the offset frequency determining circuit comprises:
a candidate frequency offset generating circuit, generating a plurality of candidate frequency offsets according to the peak frequency; and
a frequency offset selecting circuit, selecting the estimated carrier frequency offset from the plurality of candidate frequency offsets, and
wherein the candidate frequency offset generating circuit generates the plurality of candidate frequency offsets according to an equation:

$$\Omega \cong M\Delta f_n + n/T,$$

wherein, $\Omega$ represents the peak frequency, T represents a symbol duration of the input signal, n represents an index value, $\Delta f_n$ represents a candidate frequency offset corresponding to the index value n, and respective index values of the candidate frequency offsets are different.

14. An apparatus for estimating carrier frequency offset, comprising:
an $M^{th}$ power circuit, performing an $M^{th}$ power calculation on an input signal to generate an $M^{th}$ power calculation result, where M is an integer greater than 1 and is associated with a modulation scheme applied to the input signal;
a spectrum generating circuit, generating an $M^{th}$ power spectrum according to the $M^{th}$ power calculation result;
a peak frequency determining circuit, determining a peak frequency corresponding to an amplitude peak from the $M^{th}$ power spectrum; and
a frequency offset determining circuit, determining an estimated carrier frequency offset according to the peak frequency,
wherein the offset frequency determining circuit comprises:
a candidate frequency offset generating circuit, generating a plurality of candidate frequency offsets according to the peak frequency; and
a frequency offset selecting circuit, selecting the estimated carrier frequency offset from the plurality of candidate frequency offsets, and
wherein the frequency offset selecting circuit comprises:
a correcting circuit, correcting the input signal to generate a plurality of corresponding correction results according to the plurality of candidate frequency offsets, respectively;
a signal quality evaluating circuit, generating a signal quality index according to each of the plurality of correction results; and
a frequency offset selecting circuit, selecting a candidate frequency offset corresponding to an optimum signal quality index from the plurality of candidate frequency offsets as the estimated carrier frequency offset.

* * * * *